US012481332B2

United States Patent
Sun et al.

(10) Patent No.: US 12,481,332 B2
(45) Date of Patent: Nov. 25, 2025

(54) FOLDING MECHANISM AND DISPLAY DEVICE

(71) Applicant: BOE Technology Group Co., Ltd., Beijing (CN)

(72) Inventors: Baofeng Sun, Beijing (CN); Yonghong Zhou, Beijing (CN); Shouchuan Zhang, Beijing (CN); Shangchieh Chu, Beijing (CN); Linlin Xu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 144 days.

(21) Appl. No.: 18/576,463

(22) PCT Filed: Jul. 4, 2022

(86) PCT No.: PCT/CN2022/103743
§ 371 (c)(1),
(2) Date: Jan. 4, 2024

(87) PCT Pub. No.: WO2023/280126
PCT Pub. Date: Jan. 12, 2023

(65) Prior Publication Data
US 2024/0329696 A1   Oct. 3, 2024

(30) Foreign Application Priority Data

Jul. 6, 2021   (CN) .......................... 202110769967.6

(51) Int. Cl.
*G06F 1/16*   (2006.01)
(52) U.S. Cl.
CPC .......... *G06F 1/1681* (2013.01); *G06F 1/1616* (2013.01); *G06F 1/1652* (2013.01)

(58) Field of Classification Search
CPC ....................................................... H05K 7/00
See application file for complete search history.

(56) References Cited

U.S. PATENT DOCUMENTS

| 10,001,810 B2 | 6/2018 | Yoo et al. |
| 10,386,894 B2 | 8/2019 | Hsu |

(Continued)

FOREIGN PATENT DOCUMENTS

| CN | 205858944 U | 1/2017 |
| CN | 207010741 U | 2/2018 |

(Continued)

OTHER PUBLICATIONS

International Search Report and Written Opinion mailed on Sep. 14, 2022, in corresponding PCT/CN2022/103743, 10 pages.

(Continued)

*Primary Examiner* — Jerry Wu
(74) *Attorney, Agent, or Firm* — XSENSUS LLP

(57) ABSTRACT

The present disclosure relates to a folding mechanism, including: a supporting beam; a rotating shaft assembly, including a plurality of rotating shafts extended along a length direction of the supporting beam, wherein the plurality of rotating shafts include a positioning shaft and transmission shafts distributed on both sides of the positioning shaft, and the positioning shaft is disposed on the supporting beam; a transmission assembly sequentially coupling individual rotating shafts in series along a distribution direction of the rotating shafts, wherein any rotating shaft is rotatable around an adjacent rotating shaft; and two bearing frames coupled to both sides of the transmission assembly, wherein the two bearing frames are rotatable around the positioning shaft between a first form, an unfolded form and a second form under transmission of the rotating shaft assembly and the transmission assembly.

17 Claims, 10 Drawing Sheets

(56) References Cited

U.S. PATENT DOCUMENTS

| | | | |
|---|---|---|---|
| 10,503,210 B2 | 12/2019 | Lee et al. | |
| 2016/0370829 A1* | 12/2016 | Hsu | G06F 1/1681 |
| 2017/0227994 A1 | 8/2017 | Hsu | |
| 2018/0011515 A1 | 1/2018 | Yoo et al. | |
| 2018/0150107 A1 | 5/2018 | Lee et al. | |
| 2021/0149436 A1 | 5/2021 | Myung et al. | |
| 2021/0181808 A1* | 6/2021 | Liao | H04M 1/0216 |
| 2021/0200277 A1 | 7/2021 | Park et al. | |
| 2022/0192037 A1 | 6/2022 | Han | |

FOREIGN PATENT DOCUMENTS

| | | |
|---|---|---|
| CN | 108428408 A | 8/2018 |
| CN | 208073970 U | 11/2018 |
| CN | 108965505 A | 12/2018 |
| CN | 110767091 A | 2/2020 |
| CN | 210889699 U | 6/2020 |
| CN | 111508367 A | 8/2020 |
| CN | 211557294 U | 9/2020 |
| CN | 111770217 A | 10/2020 |
| CN | 211778479 U | 10/2020 |
| CN | 112150921 A | 12/2020 |
| CN | 112204498 A | 1/2021 |
| CN | 112228445 A | 1/2021 |
| CN | 112228446 A | 1/2021 |
| CN | 112230713 A | 1/2021 |
| CN | 112230714 A | 1/2021 |
| CN | 112233549 A | 1/2021 |
| CN | 112235439 A | 1/2021 |
| CN | 112235440 A | 1/2021 |
| CN | 112384876 A | 2/2021 |
| CN | 112392850 A | 2/2021 |
| CN | 112398977 A | 2/2021 |
| CN | 113383378 A | 9/2021 |
| CN | 113539090 A | 10/2021 |
| EP | 3456036 A1 | 3/2019 |
| EP | 3456036 B1 | 8/2020 |
| JP | 2020-133853 A | 8/2020 |
| WO | 2018/008865 A1 | 1/2018 |
| WO | 2021/007978 A1 | 1/2021 |
| WO | 2021/031694 A1 | 2/2021 |
| WO | 2021/085985 A1 | 5/2021 |

OTHER PUBLICATIONS

Office Action issued on Oct. 21, 2022, in corresponding Chinese patent Application No. 202110769967.6, 20 pages.

* cited by examiner

FOLDING MECHANISM AND DISPLAY DEVICE

CROSS-REFERENCE TO RELATED APPLICATIONS

The present disclosure is the 371 application of PCT Application No. PCT/CN2022/103743, filed on Jul. 4, 2022, which is based upon and claims the priority to the Chinese Patent Application NO. 202110769967.6, entitled "FOLDING MECHANISM AND DISPLAY DEVICE", filed on Jul. 6, 2021, the entire contents of each are hereby incorporated by reference.

TECHNICAL FIELD

The present disclosure relates to the field of display technologies, and in particular, to a folding mechanism and a display device.

BACKGROUND

In electronic devices such as mobile phones, display panels are indispensable components, through which pictures are displayed and human-computer interaction is performed with the user. Foldable electronic devices are gaining widespread attention, and require the use of bendable flexible display panels.

It should be noted that the information disclosed in the Background section above is only for enhancing the understanding of the background of the present disclosure, and thus may include information that does not constitute prior art known to those of ordinary skill in the art.

SUMMARY

The present disclosure provides a folding mechanism and a display device.

According to an aspect of the present disclosure, there is provided a folding mechanism, including:
  a supporting beam;
  a rotating shaft assembly, including a plurality of rotating shafts extended along a length direction of the supporting beam, wherein the plurality of rotating shafts include a positioning shaft and transmission shafts distributed on both sides of the positioning shaft, and the positioning shaft is disposed on the supporting beam;
  a transmission assembly sequentially coupling individual rotating shafts in series along a distribution direction of the rotating shafts, wherein any rotating shaft is rotatable around an adjacent rotating shaft; and
  two bearing frames coupled to both sides of the transmission assembly, wherein the two bearing frames are rotatable around the positioning shaft between a first form, an unfolded form and a second form under transmission of the rotating shaft assembly and the transmission assembly,
  wherein the two bearing frames and the individual rotating shafts are distributed along a plane in the unfolded form, the two bearing frames are arranged oppositely and located on a side of the positioning shaft in the first form, and the two bearing frames are arranged oppositely and located on the other side of the positioning shaft in the second form.

According to an aspect of the present disclosure, there is provided a display device, including:

the folding mechanism described in any of the above embodiments; and
a flexible display panel with a bending area and flat areas on both sides of the bending area, wherein the flat areas are attached to the bearing frames in a one-to-one correspondence, and the bending area corresponds to the rotating shaft assembly.

It should be noted that the above general description and the following detailed description are merely exemplary and explanatory and should not be construed as limiting of the disclosure.

BRIEF DESCRIPTION OF THE DRAWINGS

The drawings here are incorporated into the specification and constitute a part of the specification, show embodiments in accordance with the present disclosure, and are used together with the description to explain principles of the present disclosure. Obviously, the drawings in the following description are only some embodiments of the present disclosure. For those of ordinary skill in the art, other drawings can also be obtained based on these drawings without creative work.

DETAILED DESCRIPTION

Figure 1:
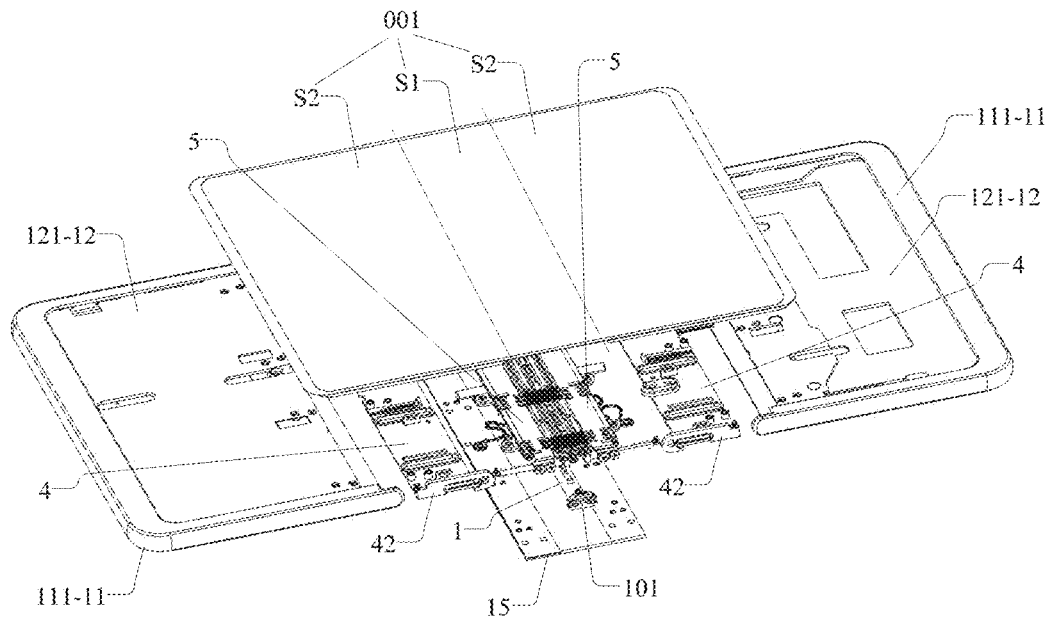
FIG. 1 is an exploded view of a display device according to an embodiment of the present disclosure.

Example embodiments will now be described more fully with reference to the accompanying drawings. However, the example embodiments can be implemented in a variety of forms and should not be construed as being limited to the embodiments set forth herein: rather, these embodiments are provided so that the present disclosure will be completer and more comprehensive so as to convey the idea of the example embodiments to those skilled in this art. The same reference numerals in the drawings denote the same or similar structures, and the detailed description thereof will be omitted. In addition, the drawings are merely schematic illustration of the present disclosure and are not necessarily drawn to scale.

Although the relative terms such as "above" and "below" are used in the specification to describe the relative relationship of one component to another component shown, these terms are only for convenience in this specification, for example, according to an example direction shown in the drawings. It will be understood that if the device shown is flipped upside down, the component described as "above" will become a component "below" another component. When a structure is "on" another structure, it may mean that a structure is integrally formed on another structure, or that a structure is "directly" disposed on another structure, or that a structure is "indirectly" disposed on another structure through other structures.

The terms "one", "a", "the", "said", and "at least one" are used to indicate that there are one or more elements/components or the like: the terms "include" and "have" are used to indicate an open meaning of including and means that there may be additional elements/components/etc. in addition to the listed elements/components/etc.; and the terms "first", "second" and "third" etc. are used only as markers, and do not limit the number of objects.

Embodiments of the present disclosure provide a folding mechanism configured to drive a flexible display panel to fold.

As shown in FIG. 1, a flexible display panel 001 may include a bending area S1 and flat areas S2 located on both sides of the bending area S1. The bending area S1 can be bent or flattened, so that the flexible display panel 001 can be switched between a plurality of forms.

A specific structure of the flexible display panel 001 is not particularly limited here, as long as it can display an image and can be bent. For example, the flexible display panel 001 may be divided into a display area and a peripheral area located outside the display area, and includes a driving backplane and a light-emitting device layer. The light-emitting device layer is disposed on a side of the driving backplane and includes a plurality of light-emitting devices located in the display area. The light-emitting device may be an OLED, that is, an organic light-emitting diode. The driving backplane may include a pixel circuit located in the display area and a peripheral circuit located in the peripheral area. Both the pixel circuit and the peripheral circuit may include a plurality of transistors, and the peripheral circuit is coupled to the pixel circuit, and may include a light-emitting control circuit, a gate driving circuit, a source driving circuit, etc. The light-emitting device can be made to emit light through the peripheral circuit and the pixel circuit to display the image.

In addition, the flexible display panel 001 may further include a protective layer and a supporting layer. The protective layer may cover a surface of the driving backplane away from the light-emitting device layer. The protective layer may have a single-layer or multi-layer structure, and its structure and material are not particularly limited here. The supporting layer may be disposed on a side of the protective layer away from the driving backplane to improve the strength of the flexible display panel 001 while still ensuring that the flexible panel 001 is bendable. A portion of the supporting layer located in the bending area S1 is provided with a plurality of openings penetrating the supporting layer. A shape and size of the opening are not particularly limited here. The flexibility in the bending area S1 can be increased through the openings to ensure that the bending area S1 can be bent smoothly. A material of the supporting layer may be metal such as stainless steel, but it is not limited thereto, and other materials may also be used.

As shown in FIGS. 1 to 7, 11 and 13, the folding mechanism of the present disclosure may include a supporting beam 1, a rotating shaft assembly 2, a transmission assembly 3 and two bearing frames 4.

The rotating shaft assembly 2 includes a plurality of rotating shafts 21 extending along a length direction of the supporting beam 1 and including a positioning shaft 211 and transmission shafts 212 distributed on both sides of the positioning shaft 211. The positioning shaft 211 is disposed on the supporting beam 1.

The transmission assembly 3 sequentially connects respective rotating shafts 21 in series along a distribution direction of the rotating shafts 21, and any rotating shaft 21 is rotatable around an adjacent rotating shaft 21.

The two bearing frames 4 are coupled to both sides of the transmission assembly 3. The two bearing frames 4 can, under the transmission of the rotating shaft assembly 2 and the transmission assembly 3, rotate around the positioning shaft 211 between a first form, an unfolded form and a second form.

Figure 4:
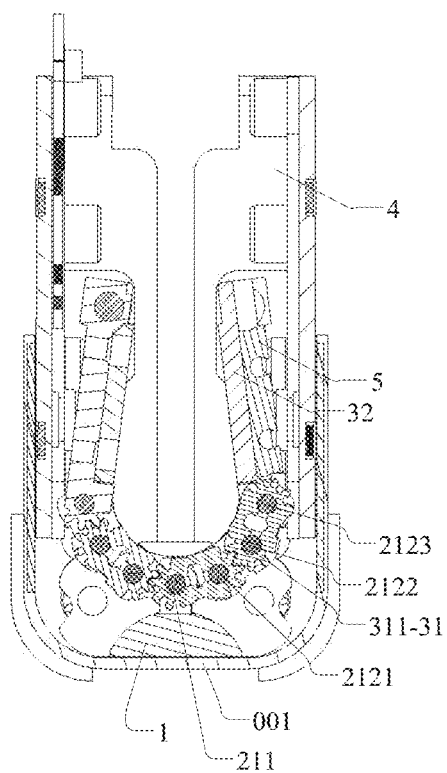
FIG. 4 is a cross-sectional view of a display device in a first form according to an embodiment of the present disclosure.
Figure 5:
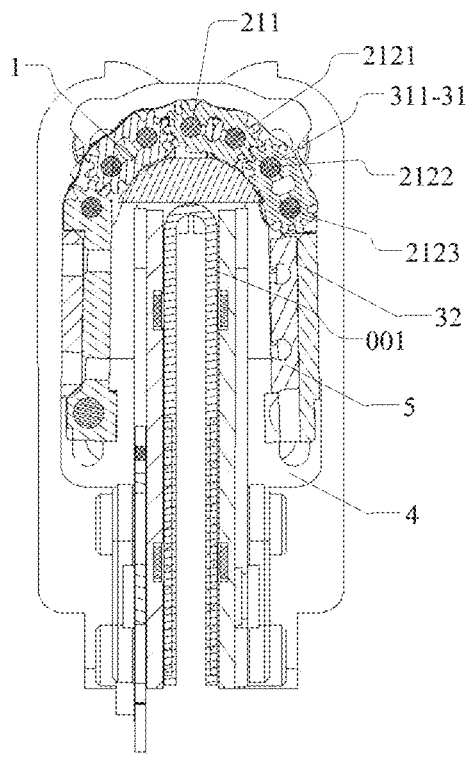
FIG. 5 is a cross-sectional view of a display device in a second form according to an embodiment of the present disclosure.
Figure 6:
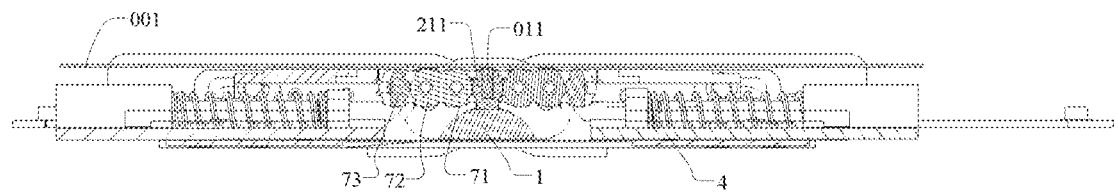
FIG. 6 is a cross-sectional view of a display device in an unfolded form according to an embodiment of the present disclosure.
Figure 7:
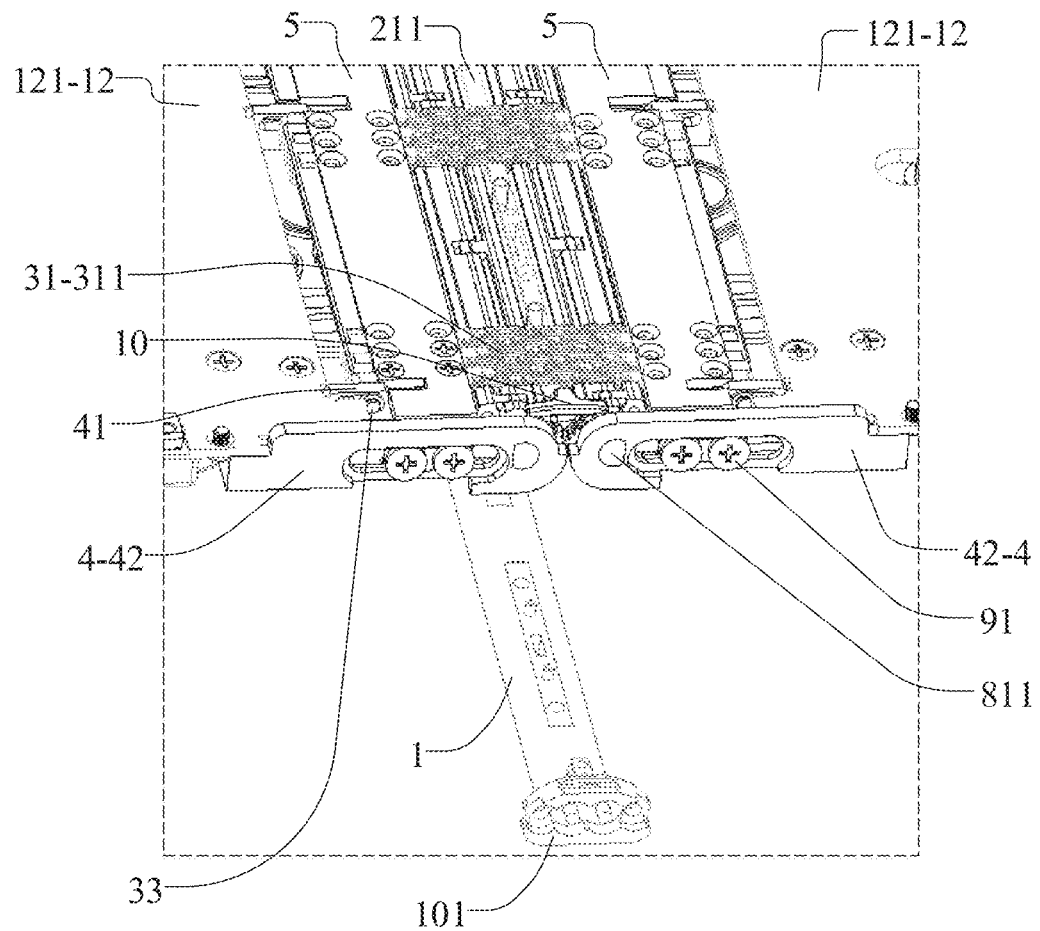
FIG. 7 is a partial exploded view of a folding mechanism according to an embodiment of the present disclosure.
Figure 8:
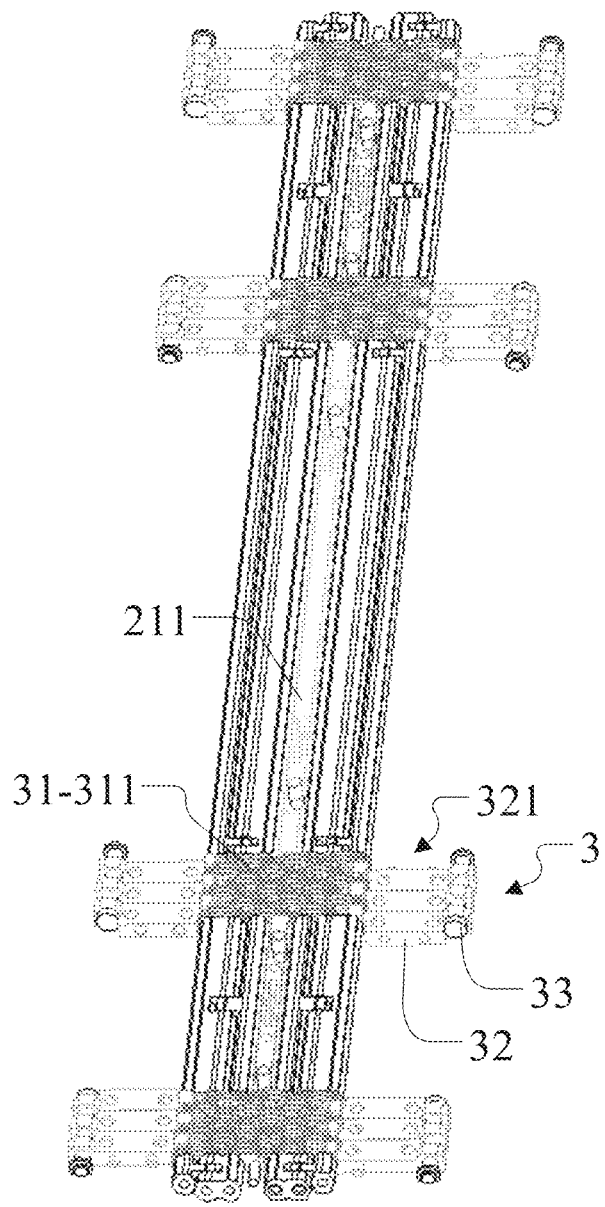
FIG. 8 is a schematic diagram of a transmission assembly and a rotating shaft assembly in a folding mechanism according to an embodiment of the present disclosure.
Figure 9:
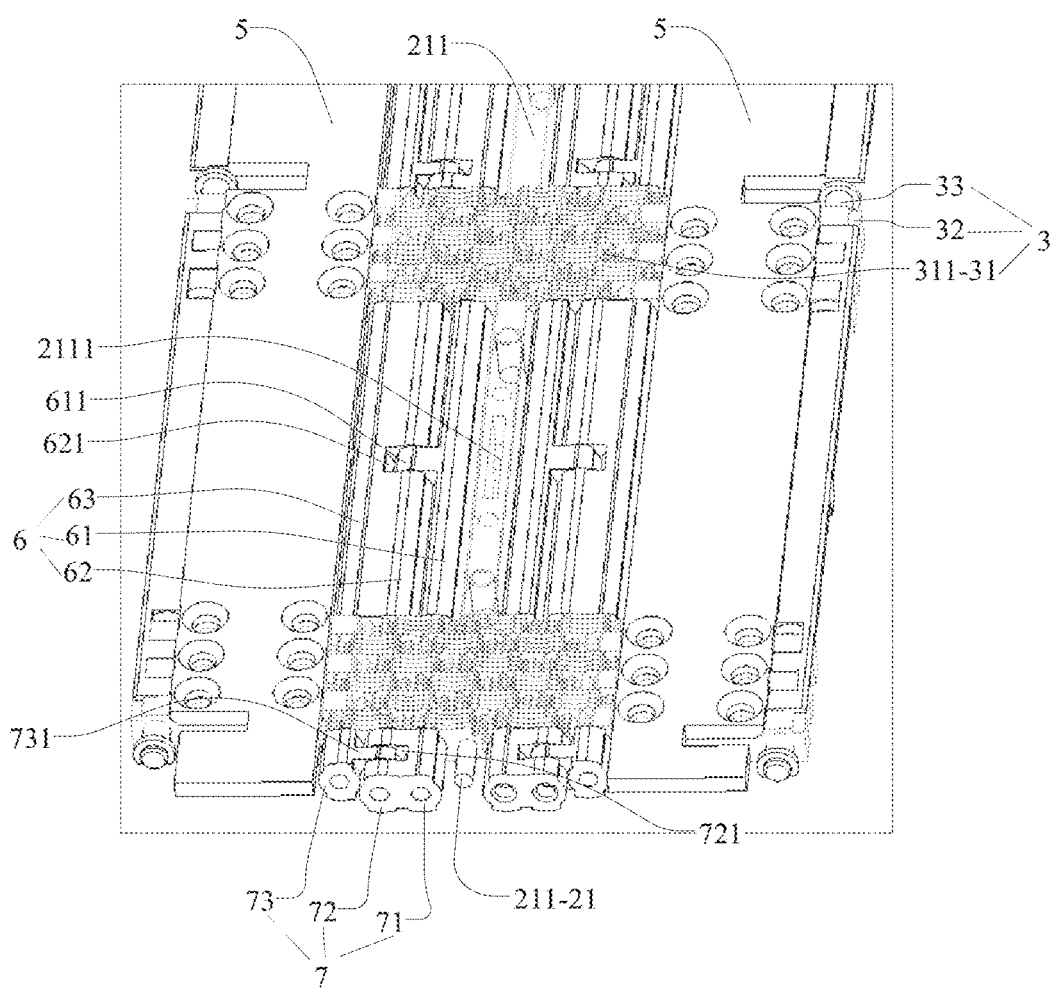
FIG. 9 is a partial schematic diagram of a folding mechanism according to an embodiment of the present disclosure.
Figure 10:
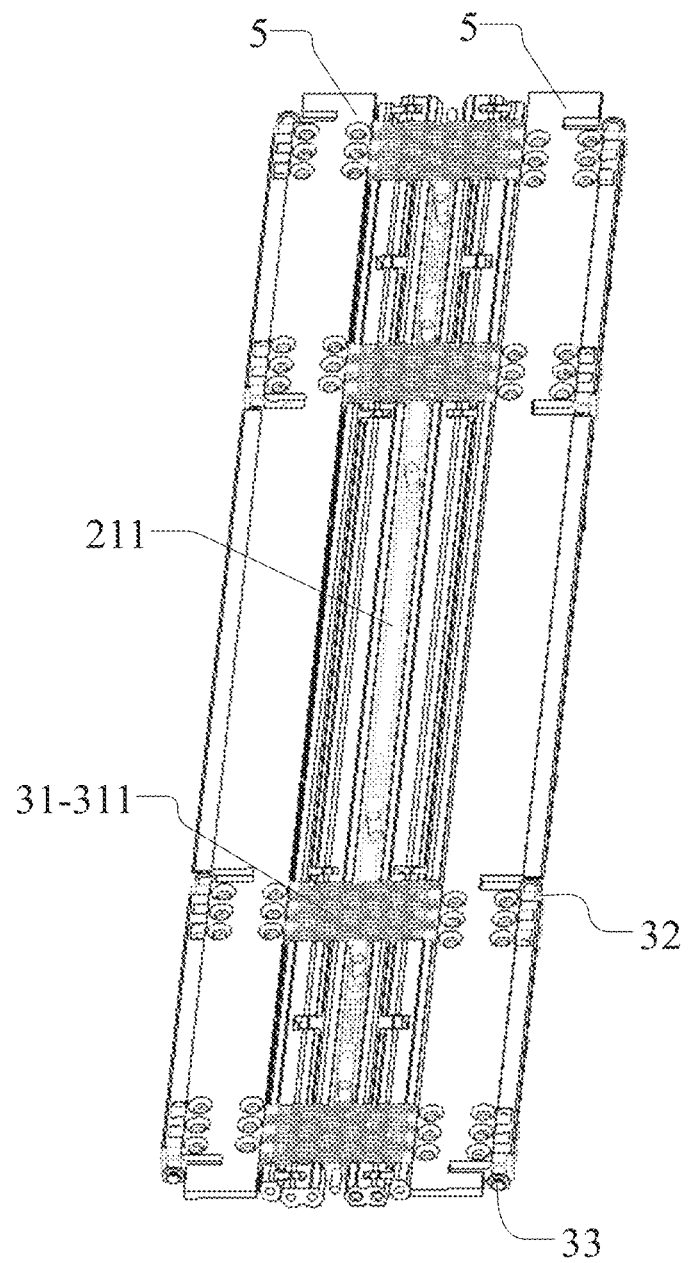
FIG. 10 is a schematic diagram of a transmission assembly, a rotating shaft assembly and a connection plate in a folding mechanism according to an embodiment of the present disclosure.

As shown in FIG. 6, in the unfolded form, the two bearing frames 4 and the individual rotating shafts 21 are distributed along a plane. That is, central axis of the individual rotating shafts 21 are located on the same plane, and the bearing frames 4 are distributed along the distribution direction of the rotating shafts 21, so as to allow surfaces, away from the bearing frame 4, of the flat area S2 and the bending area S1 of the flexible display panel 001 to be located on the same plane. As shown in FIG. 4, in the first form, the two bearing frames 4 are arranged oppositely and located on a side of the positioning shaft 211. As shown in FIG. 5, in the second form, the two bearing frames 4 are arranged oppositely and located on the other side of the positioning shaft 211.

The folding mechanism of the present disclosure can support and limit the flexible display panel 001, and drive the flexible display panel 001 to switch between three forms. During this process, due to the series connection by the transmission assembly 3, the two adjacent rotating shafts 21 can rotate relative to each other, so that the bending area S1 of the flexible display panel 001 corresponding to the rotating shaft assembly 2 can be bent, thereby using the bearing frame 4 to drive the flat area S2 to rotate, so as to switch the flexible display panel 001 between the first form, the unfolded form and the second form. In the unfolded form, the flexible display panel 001 is flattened without being folded. The flexible display panel 001 can be folded in the opposite directions, so that the flexible display panel 001 may be switched between the unfolded form and the first form and between the unfolded form and the second form.

Thus, bidirectional folding can be achieved, and the flexible display panel 001 is supported during the folding process.

Each part of the folding mechanism of the present disclosure is described in detail below:

As shown in FIGS. 4 to 7, the supporting beam 1 is configured to support the rotating shaft assembly 2. For example, the positioning shaft 211 among the individual rotating shafts 21 may be disposed on the supporting beam 1, and the transmission shaft 212 can rotate relative to the positioning shaft 211. A structure of the supporting beam 1 is not particularly limited here.

In some embodiments of the present disclosure, as shown in FIGS. 4-6 and 13, the bearing frame 4 can drive the flexible display panel 001 to switch between the first form and the second form, and a case that the flexible display panel 001 surrounds outside the supporting beam 1 inevitably occurs between the first form and the second form. In order to prevent the supporting beam 1 from scratching the flexible display panel 001, the appearance of the supporting beam 1 can be limited. For example, the supporting beam 1 may be a columnar structure, and its outer peripheral face may be surrounded by a bottom face and an arc face. The bottom face is a plane parallel to the rotating shaft 21. When the flexible display panel 001 surrounds outside the supporting beam 1, the arc face may match the shape of the flexible display panel 001, avoiding edges and corners on the supporting beam 1 that may scratch the flexible display panel 001.

Figure 11:
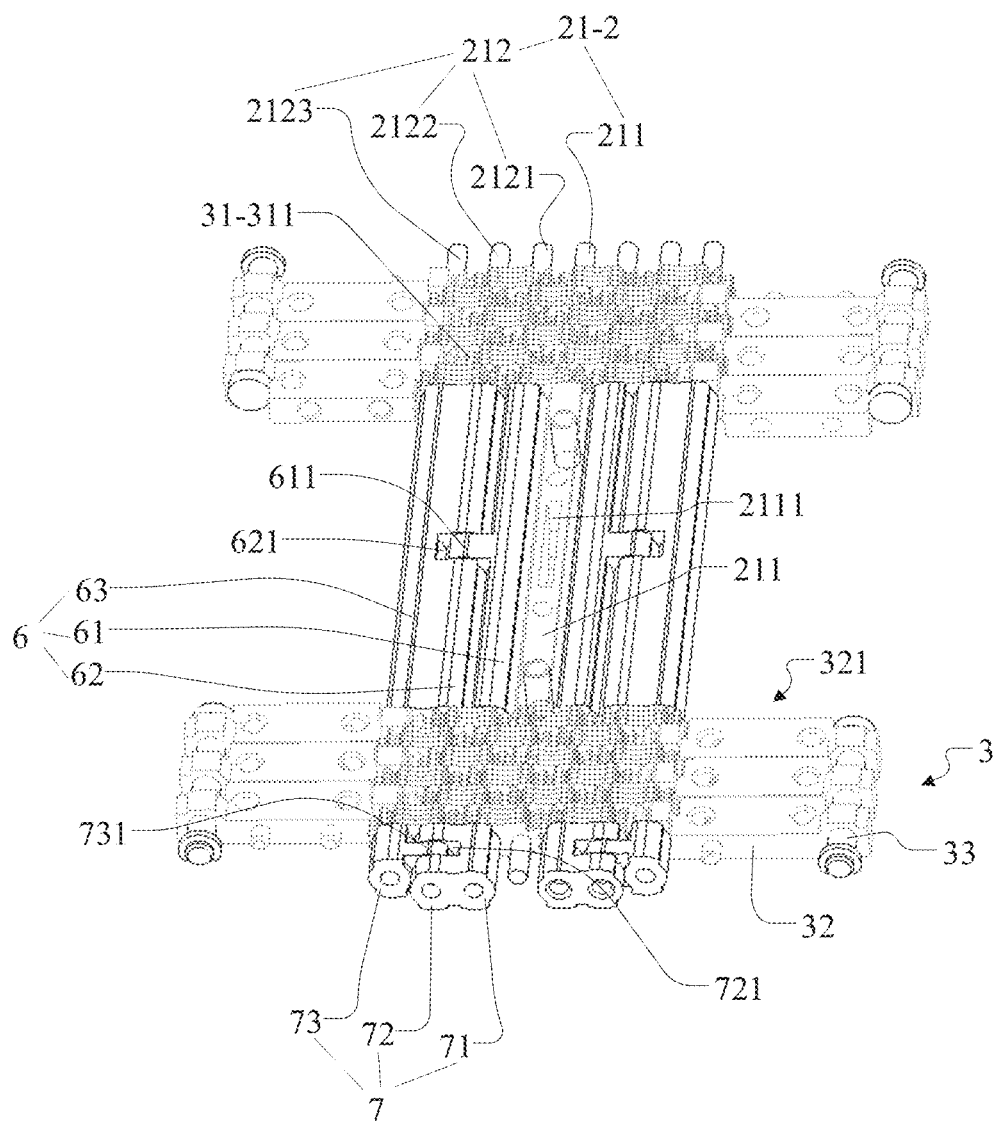
FIG. 11 is a partial schematic diagram of a transmission assembly and a rotating shaft assembly in a folding mechanism according to an embodiment of the present disclosure.
Figure 12:
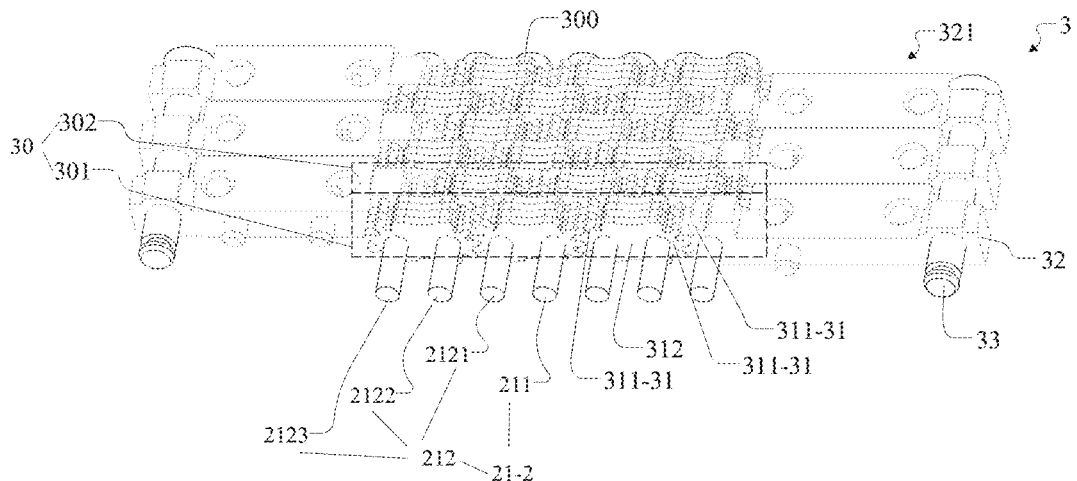
FIG. 12 is a schematic diagram of a gear chain in a folding mechanism according to an embodiment of the present disclosure.

As shown in FIGS. 11 and 12, the rotating shaft assembly 2 includes the plurality of rotating shafts 21 arranged side by side. The individual rotating shafts 21 extend along the length direction of the supporting beam 1, and include the positioning shaft 211 and the transmission shafts 212 distributed on both sides of the positioning shaft 211.

The positioning shaft 211 is disposed on the supporting beam 1. For example, the positioning shaft 211 may be detachably coupled to the supporting beam 1 in a fixed manner by snapping or by means of a connector such as a screw. For example, the positioning shaft 211 may be provided with a mounting hole, the supporting beam 1 may be provided with a positioning post, and the positioning post may be inserted into the mounting hole. Furthermore, the supporting beam 1 and the positioning shaft 211 may also be coupled through the screw or other connectors.

As shown in FIGS. 4 to 6, the individual rotating shafts 21 extend along the length direction of the supporting beam 1, that is, an axial direction of the rotating shaft 21 is in the same direction as the length direction of the supporting beam 1. In addition, the individual rotating shafts 21 include the positioning shaft 211 and the plurality of transmission shafts 212 located on both sides of the positioning shaft 211. For example, the number of rotating shafts 21 is seven, among which there is one positioning shaft 211, and there are six transmission shafts 212 that may be symmetrically distributed on both sides of the positioning shaft 211, that is, there are three transmission shafts 212 on the same side of the positioning shaft 211.

As shown in FIGS. 7 to 12, the transmission assembly 3 sequentially connects the respective rotating shafts 21 in series along the distribution direction of the rotating shafts 21, so that any rotating shaft 21 can rotate around the adjacent rotating shaft 21.

In some embodiments of the present disclosure, as shown in FIG. 12, the transmission assembly 3 may include a plurality of gear pairs 31. Each gear pair 31 includes two transmission gears 311 meshed with each other, and the two transmission gears 311 of the same gear pair 31 are respectively coupled with two rotating shafts 21 in a transmission manner, so that the two rotating shafts 21 are coupled. In addition, respective gear pairs 31 are sequentially coupled to the respective rotating shafts 21 along the distribution direction of the rotating shafts 21. That is, among three adjacent rotating shafts 21 sequentially distributed in the distribution direction of the rotating shafts 21, a middle rotating shaft 21 is coupled to the rotating shafts 21 on both side of the middle rotating shaft 21 through the gear pairs 31.

Further, as shown in FIG. 12, the respective gear pairs 31 of the transmission assembly 3 may be divided into a plurality of gear chains 30 distributed along the axial direction of the rotating shaft 21, and each gear chain 30 includes the plurality of gear pairs 31. Among two adjacent gear pairs 31 of the same gear chain 30, two transmission gears 311 coupling the adjacent rotating shafts 2 are fixedly coupled, and the fixed connection manner may be welding, snapping, etc., or the two transmission gears 311 coupling the adjacent rotating shafts 2 may be integrally formed, that is, the two transmission gears 311 may be coupled into an integral structure through a connection part 312. Moreover, each transmission gear 311 is an incomplete gear, and a rotation range of the rotating shaft 21 may be limited by a range occupied by gear teeth in the transmission gear 311 in the circumferential direction.

For example, as shown in FIG. 12, the individual gear chains 30 may include a plurality of first gear chains 301 and a plurality of second gear chains 302 alternately distributed along the axial direction of the rotating shaft 21. Respective gear pairs 31 of the first gear chains 301 are aligned in the axial direction, and respective gear pairs 31 of the second gear chains 302 are aligned in the axial direction, so that the gear pairs 31 of the first gear chain 301 and the second gear chain 302 are staggered, that is, the gear pairs 31 of the first gear chains 301 and the gear pairs 31 of the second gear chains 302 are alternately distributed along the distribution direction of the rotating shafts 21. That is, there is one gear pair 31 of the second gear chain 302 between two adjacent gear pairs 31 of the first gear chain 301, and there is one gear pair 31 of the first gear chain 301 between two adjacent gear pairs 31 of the second gear chain 302.

Furthermore, each transmission gear 311 may be a multi-layered structure stacked along the axial direction of the rotating shaft 21. For example, the transmission gear 311 may include a plurality of gear pieces 300 with the same profile stacked along the axial direction of the rotating shaft 21. By increasing or decreasing the number of gear pieces 300, a thickness of the transmission gear 311 in the axial direction can be adjusted.

The number of transmission assemblies 3 may be one or more, and the transmission assemblies 3 are distributed at intervals along the axial direction of the rotating shaft 21. That is, the respective rotating shafts 21 may be coupled through the plurality of transmission assemblies 3, so that a force on the rotating shaft 21 in the axial direction is more uniform.

Figure 13:
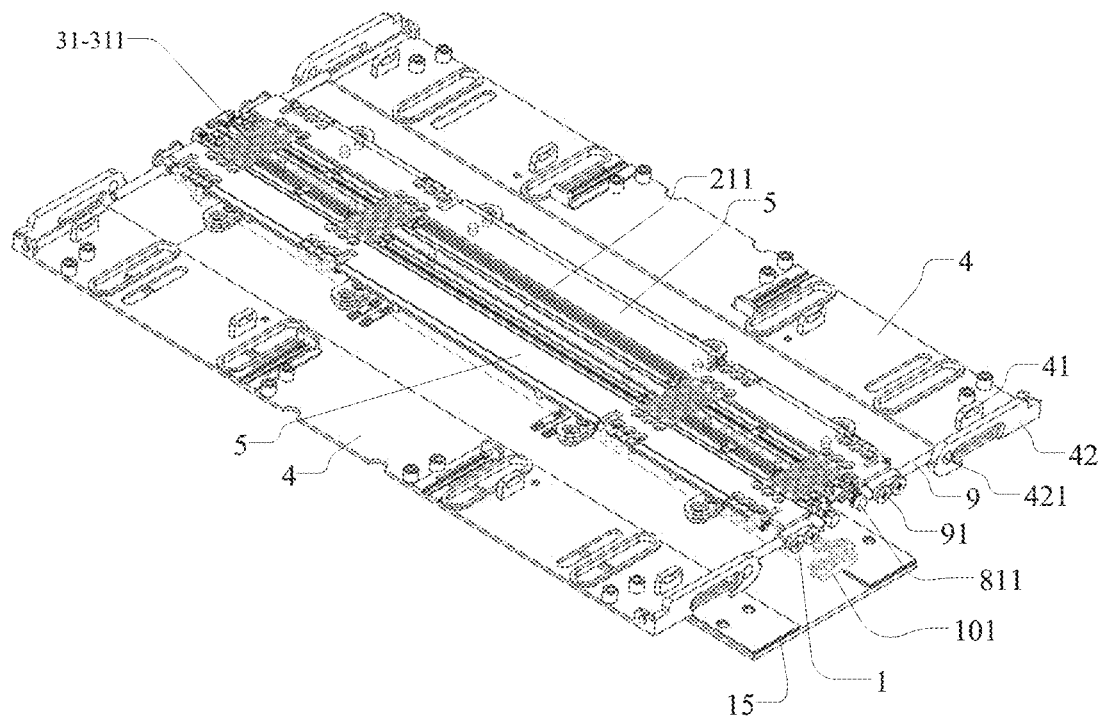
FIG. 13 is a partial exploded view of a folding mechanism according to an embodiment of the present disclosure.

As shown in FIGS. 1 and 13, the number of bearing frames 4 is two, and the bearing frame is configured to bear the flexible display panel 001. The two bearing frames 4 are coupled to both sides of the transmission assembly 3, and the flexible display panel 001 may be disposed on the bearing frames 4. For example, the two flat areas S2 of the flexible display panel 001 are respectively disposed on the two bearing frames 4, the bending area S1 is opposite to the rotating shaft assembly 2 and the transmission assembly 3, and the light-emitting device layer of the flexible display panel 001 is located on a side of the driving backplane away from the bearing frame 4. The two bearing frames 4 can, under the transmission of the rotating shaft assembly 2 and the transmission assembly 3, rotate around the positioning shaft 211 between the first form, the unfolded form and the second form. As shown in FIG. 6, in the unfolded form, the two bearing frames 4 and the individual rotating shafts 21 are distributed along the plane, and the flexible display panel 001 is flatly unfolded in this case. In the first form, the two carrying frames 4 are arranged oppositely and are located on a side of the positioning shaft 211. In the second form, the two carrying frames 4 are arranged oppositely and are located on the other side of the positioning shaft 211. For example, as shown in FIG. 4, in the first form, the flexible display panel 001 is folded outwards driven by the bearing frame 4, that is, the light-emitting device layer is located outside the driving backplane, and in this case, the user can still view the image. As shown in FIG. 5, in the second form, the flexible display panel 001 is folded inward driven by the bearing frame 4, that is, the light-emitting device layer is located inside the driving backplane, and in this case, no image may be displayed.

Furthermore, two outermost gear pairs 31 in the distribution direction of the rotating shafts 21 are respectively coupled to a bearing frame 4. When the bearing frame 4 rotates, the bearing frame 4 can drive, via the gear pair 31, the respective rotating shafts 21 to rotate, so that the bearing frame 4 can rotate between the first form, the unfolded form and the second form.

Figure 14:
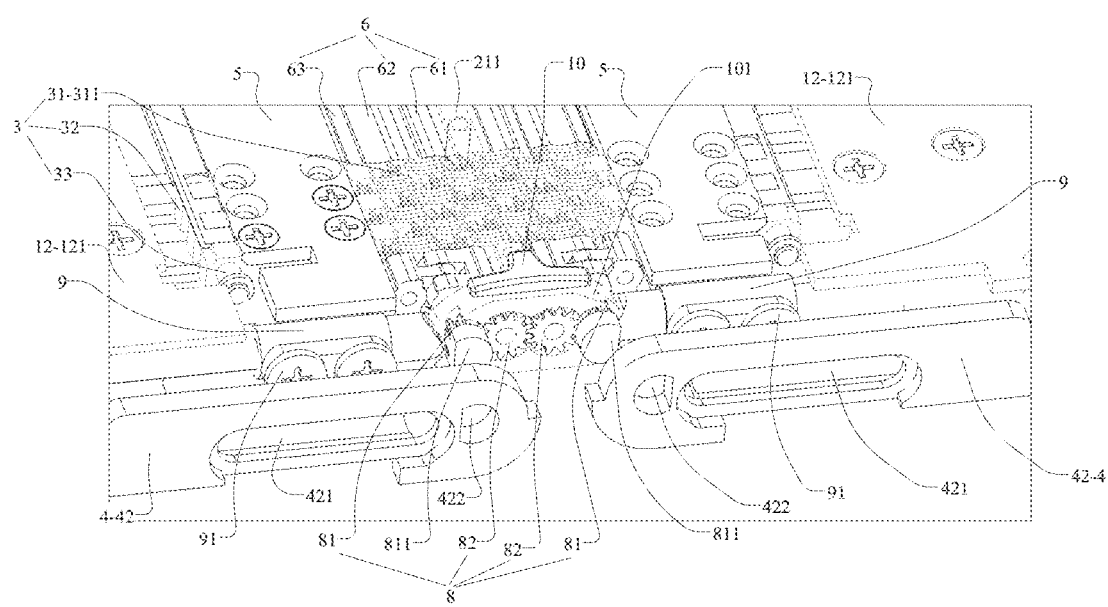
FIG. 14 is an assembly view of a synchronization assembly in a folding mechanism according to an embodiment of the present disclosure.
Figure 15:
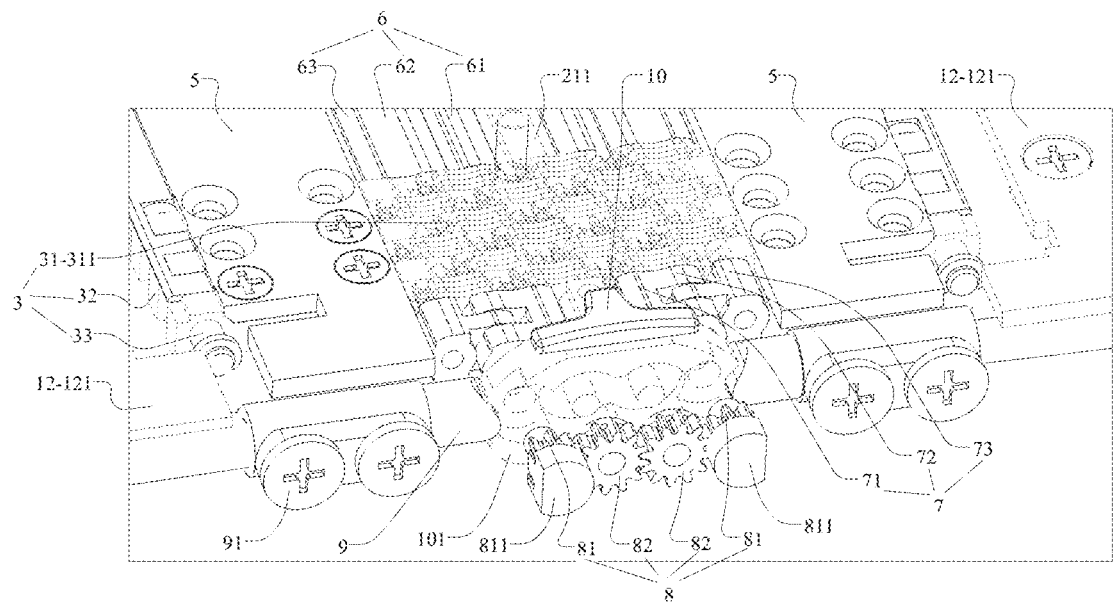
FIG. 15 is an exploded view of a synchronization assembly in a folding mechanism according to an embodiment of the present disclosure.

As shown in FIGS. 13 to 15, a coupling manner between the bearing frame 4 and the transmission assembly 3 is described in detail below:

In some embodiments of the present disclosure, as shown in FIGS. 8-12, the transmission assembly 3 further includes a plurality of connection strips 32. A transmission gear 311 coupled to the outermost rotating shaft 21 in the distribution direction of the rotating shafts 21 is fixedly coupled to a connection strip 32. The connection strip 32 extends in a direction perpendicular to the rotating shaft 21. Each gear chain 30 is coupled to only one connection strip 32.

Respective connection strips 32 located on a side of the positioning shaft 211 are coupled by a connection shaft 33 extending along the length direction of the supporting beam 1. Correspondingly, the connection shafts 33 are located on both sides of the positioning shaft 211. Any connection shaft 33 penetrates the plurality of connection strips 32, and both ends of the connection shaft 33 are located outside the connection strips 32. In addition, a connection shaft 33 located on a side of the positioning shaft 211 is rotatably coupled to a bearing frame 4, and a connection shaft 33 located on the other side of the positioning shaft 211 is rotatably coupled to the other bearing frame 4, so that the connection shaft 33 and the connection strip 32 can be driven to rotate by the bearing frame 4, and in turn, the gear chain 30 is driven to transmit between the two bearing frames 4, so that the two bearing frames 4 can rotate relative to each other.

Further, as shown in FIG. 13, the bearing frame 4 may be provided with a supporting base 41. The supporting base 41 is provided with a through hole penetrating along the axial direction of the rotating shaft 21, and an end of the connection shaft 33 is inserted into the through hole, thereby being rotatably inserted into the supporting base 41.

In some embodiments of the present disclosure, as shown in FIGS. 8 to 12, the number of transmission assemblies is one or more. In order to avoid inconsistent movement of the individual transmission assemblies 3, the folding mechanism may further include two connection plates 5. Respective connection strips 32 located on a side of the positioning shaft 211 are fixedly coupled to a connection plate 5, and respective connection strips 32 located on the other side of the positioning shaft 211 are fixedly coupled to the other connection plate 5. The fixed coupling may be performed by snapping, bonding or by means of a connector such as a screw: In addition, the connection plate 5 may be attached to the flexible display panel 001 to play the role of supporting the flexible display panel 001. In order to reduce the overall thickness of the connection strip 32 and the connection plate 5, the connection strip 32 may have a recessed portion 321, and the connection plate 5 is at least partially embedded in the recessed portion 321, so that the connection plate 5 can be limited by the recessed portion 321, and the overall thickness can be reduced.

In some embodiments of the present disclosure, as shown in FIGS. 9-12, the number of transmission assemblies 3 is one or more, and the transmission assemblies 3 are distributed at intervals along the axial direction of the rotating shaft 21. Each transmission shaft 212 may be provided with an intermediate shaft sleeve 6 in an area of the transmission shaft 212 between two adjacent transmission assemblies 3.

The number of transmission shafts 212 is six, and the transmission shafts 212 are symmetrically distributed on both sides of the positioning shaft 211. The transmission shafts 212 located on either side of the positioning shaft 211 include a first transmission shaft 2121, a second transmission shaft 2122 and a third transmission shaft 2123 distributed in a direction away from the positioning shaft 211.

An area of the first transmission shaft 2121 located between two adjacent transmission assemblies 3 is sleeved with a first intermediate shaft sleeve 61. An area of the second transmission shaft 2122 located between two adjacent transmission assemblies 3 is sleeved with a second intermediate shaft sleeve 62. An area of the third transmission shaft 2123 located between two adjacent transmission assemblies 3 is sleeved with a third intermediate shaft sleeve 63.

The first intermediate shaft sleeve 61 has a first extension portion 611 extending in a radial direction. The second intermediate shaft sleeve 62 is provided with a first notch 621 exposing the second transmission shaft 2122. The first extension portion 611 is rotatably fitted in the first notch 621, and is sleeved on the second transmission shaft 2122. The second intermediate shaft sleeve 62 is fixedly coupled to the third intermediate shaft sleeve 63. Each rotating shaft 21 and the intermediate shaft sleeve 6 may be fixedly coupled, or may be an integral structure.

In some embodiments of the present disclosure, as shown in FIGS. 9-12, the number of transmission assemblies 3 is one or more, and the transmission assemblies 3 are distributed at intervals along the axial direction of the rotating shaft 21. An end shaft sleeve 7 may be disposed at an end of each transmission shaft 212.

The number of transmission shafts 212 is six, and the transmission shafts 212 are symmetrically distributed on both sides of the positioning shaft 211. The transmission shafts 212 located on either side of the positioning shaft 211 include a first transmission shaft 2121, a second transmission shaft 2122 and a third transmission shaft 2123 distributed in the direction away from the positioning shaft 211.

An end of the first transmission shaft 2121 is sleeved with a first end shaft sleeve 71, an end of the second transmission shaft 2122 is sleeved with a second end shaft sleeve 72, and an end of the third transmission shaft 2123 is sleeved with a third end shaft sleeve 73.

The first end shaft sleeve 71 is fixedly coupled to the second end shaft sleeve 72. The third end shaft sleeve 73 has a second extension portion 731 extending in the radial direction. The second end shaft sleeve 72 is provided with a second notch 721 exposing the second transmission shaft 2122. The second extension portion 731 is rotatably fitted in the second notch 721, and is sleeved on the second transmission shaft 2122. Each rotating shaft 21 can rotate relative to the end shaft sleeve 7 which it penetrates, so that a relative position between the rotating shafts 21 can be limited by respective end shaft sleeves 7 without affecting the rotation of the rotating shafts 21.

As shown in FIGS. 14 and 15, in order to ensure that the two bearing frames 4 can rotate synchronously, the folding mechanism of the present disclosure may further include a synchronization assembly 8, which may be disposed at an end of the supporting beam 1 and coupled between the two bearing frames 4. The synchronization assembly 8 may be configured to make the two bearing frames 4 rotate synchronously.

In some embodiments of the present disclosure, as shown in FIGS. 1, 7, and 13-15, an end of the supporting beam 1 is provided with a mounting frame 101, and the rotating shaft assembly 2 is located on a side of the mounting frame 101 close to the supporting beam 1. The mounting frame 101 and the supporting beam 1 may be an integral structure, or independent structures that are fixedly coupled.

As shown in FIGS. 14 and 15, the synchronization assembly 8 may include two driving gears 81 and two driven gears 82 disposed on the mounting frame 101. The two driven gears 82 are meshed between the two driving gears 81, and an axial direction of the driving gear 81 and the driven gear 82 is the same as the axial direction of the rotating shaft 21. When any driving gear 81 rotates, the other driving gear 81 may rotate synchronously through the transmission of the driven gears 82, and rotation directions of the two driving gears 81 are opposite.

The bearing frames 4 are fixedly coupled to the two driving gears 81 in a one-to-one correspondence. Any bearing frame 4 can rotate around a central axis of a driving gear 81 to which it is coupled, so that the bearing frames 4 can rotate synchronously through the synchronization assembly 8, and the rotation directions of the bearing frames 4 are opposite to make the flexible display panel 001 folded.

As shown in FIGS. 14 and 15, in order to facilitate the coupling between the bearing frame 4 and the driving gear 81, an end face of the driving gear 81 away from the supporting beam 1 may be provided with a connection disk 811, and a central axis of the connection disk 811 may be collinear with a center axis of the driving gear 81. The bearing frame 4 is provided with a connection hole 422, and the connection plate 811 is snapped into the connection hole 422, so that the driving gear 81 may be driven to rotate through the supporting beam 1. In order to prevent the connection disk 811 from slipping in the connection hole 422, an outer circumferential face of the connection disk 811 can have at least one flat surface, and a shape of the connection hole 422 matches the outer circumferential face of the connection disk 811. Please note that the connection disk 811 may also be circular and the connection disk 811 is fixed in the connection hole 422 through interference fit or other means.

The number of mounting frames 101 is two, and the mounting frames 101 are located at both ends of the supporting beam 1. The two mounting frames 101 are provided with the above-mentioned driving gear 81 and driven gear 82. The two bearing frames 4 can synchronously rotate through the driving gears 81 and the driven gears 82 at both ends of the supporting beam 1, and the specific principle has been explained above and will not be described in detail here.

In addition, in order to ensure that the flexible display panel 001 will not rotate freely in the unfolded form, limit grooves may be opened at both sides of the mounting frame 101, and limit posts 9 may be disposed at positions of the two bearing frames 4 corresponding to the limit grooves 9. The limit post 9 may extend in the direction perpendicular to the positioning shaft 211 and is slidably coupled to the bearing frame 4 so as to slide back and forth in the direction perpendicular to the positioning shaft 211. For example, the bearing frame 4 may be provided with a guide plate 42. The guide plate 42 is provided with a sliding groove 421 extending in the direction perpendicular to the positioning shaft 211. An outer circumferential face of the limit post 9 is provided with a slider 91, and the slider 91 is slidably disposed in the sliding groove 421, so that the limit post 9 can slide back and forth along the sliding groove 421 in the direction perpendicular to the positioning shaft 211. The slider 91 may be a member such as a screw fixed on the limit post 9 for easy disassembly, or a protrusion integrally formed on the limit post 9.

In addition, the bearing frame 4 may be provided with an elastic member, and the elastic member may exert a force, toward the limit groove, on the limit post 9 along an axial direction of the limit post 9. The elastic member may be a spring, a rubber band, or the like. When the bearing frame 4 is in the unfolded form, the elastic member can make an end of the limit post 9 fit in the limit groove. In this case, if no external force is applied to rotate the bearing frame 4, the two bearing frames 4 can remain in the unfolded form, and if the bearing frame 4 is rotated by the external force, the end of the limit post 9 can slide along the outer circumferential face of the mounting frame 101 until it slides out of the limit groove. At this time, the bearing frame 4 can rotate to the first form and the second form.

In order to prevent the limit post 9 from getting stuck in the limit groove, the end of the limit post 9 located in the limit groove may be a smooth curved surface, and an inner wall of the limit groove may be a smooth curved surface, and is in a smooth transition with the outer circumferential face of the mounting frame 101.

Figure 2:
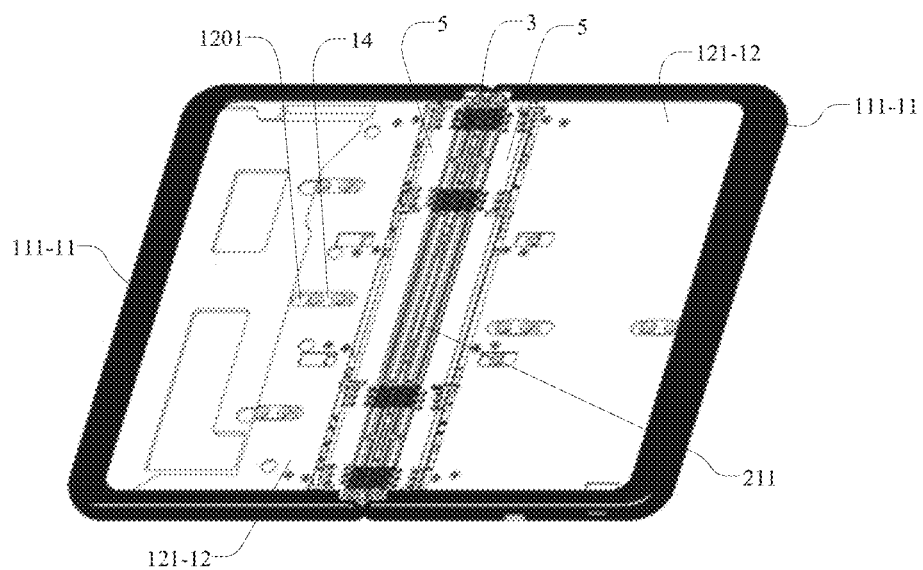
FIG. 2 is an assembly diagram of a folding mechanism according to an embodiment of the present disclosure.
Figure 3:
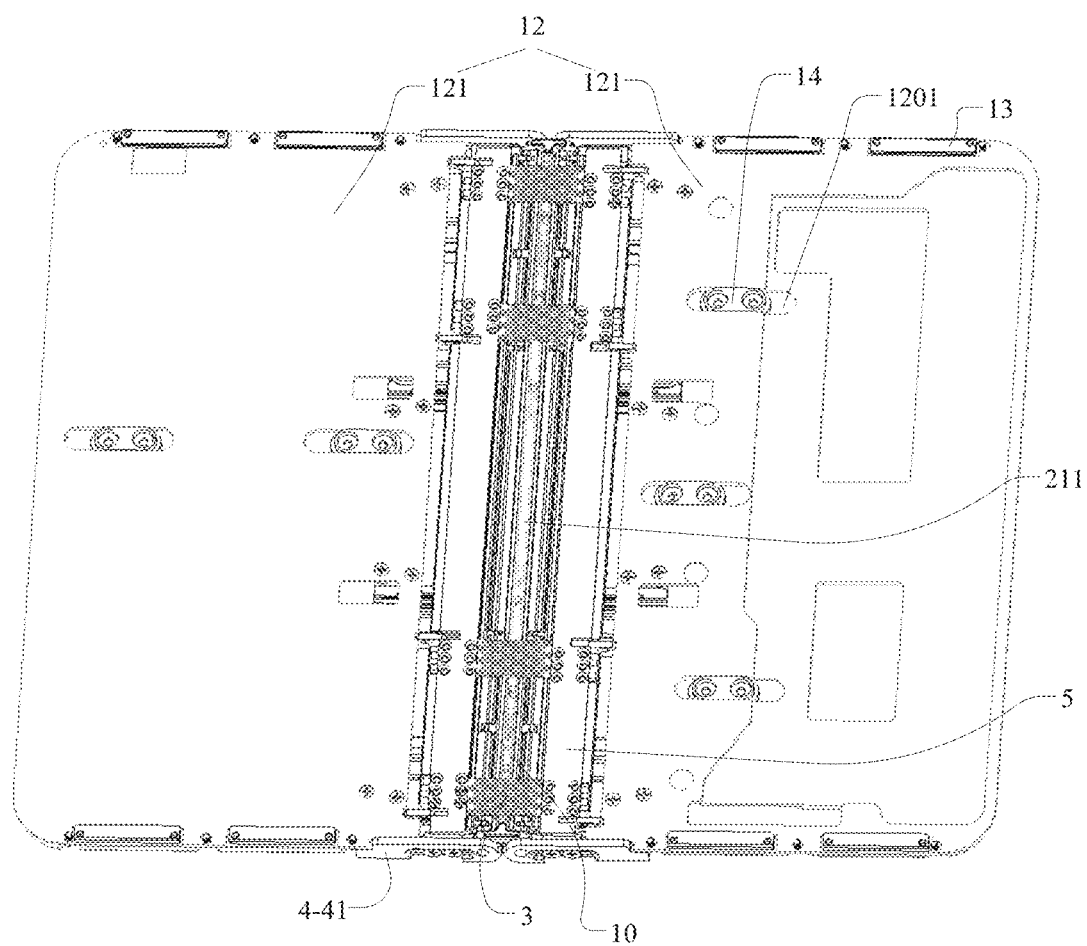
FIG. 3 is a partial assembly diagram of a folding mechanism according to an embodiment of the present disclosure.

Embodiments of the present disclosure further provide a display device. As shown in FIGS. 1-3, the display device may include a flexible display panel 001 and the folding mechanism of any of the above embodiments.

The flexible display panel 001 has a bending area S1 and flat areas S2 on both sides of the bending area S1. The flat areas S2 are attached to the bearing frames 4 in a one-to-one correspondence, and the bending area S1 corresponds to the rotating shaft assembly 2. For the structure of the folding mechanism, reference may be made to the embodiments of the folding structure described above, which will not be described again here.

Further, as shown in FIGS. 1 to 3, the display device further includes a front frame 11 and a middle frame 12.

The front frame 11 is arranged around the flexible display panel 001 and includes two front frame bodies 111 spaced apart from each other. One front frame body 110 is at least partially covered on an outer edge of a bearing frame 4, and the other front frame body 111 is at least partially covered on an outer edge of the other bearing frame 4. The middle frame 12 is disposed between the flexible display panel 001 and the bearing frame 4, and includes two middle frame bodies 121 disposed in the two front frame bodies 111 in a one-to-one correspondence. The bearing frame 4 and the middle frame body 121 in the same front frame body 111 are coupled. During the folding, the front frame body 111, the middle frame body 121 and the bearing frame 4 that are interconnected can move synchronously.

Figure 16:
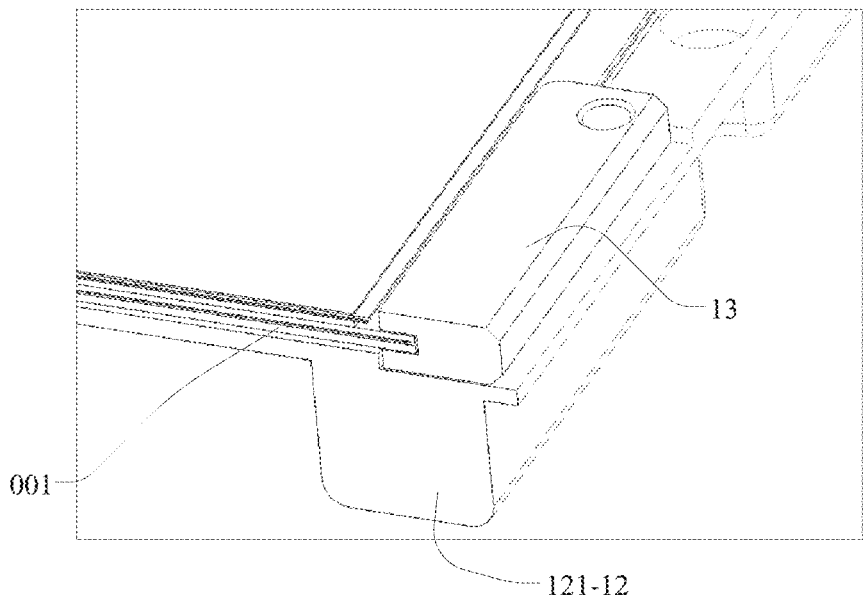
FIG. 16 is a schematic diagram of a guide block in a folding mechanism according to an embodiment of the present disclosure.

Further, as shown in FIGS. 3 and 16, in some embodiments of the present disclosure, the display device further includes a plurality of guide blocks 13 fixed on a side of the middle frame 12 away from the bearing frame 4 and distributed along a circumferential direction of the flexible display panel 001. The guide block 13 is provided with a guide groove that penetrates the guide block 13 along the circumferential direction of the flexible display panel 001. An edge of the flexible display panel 001 is slidably fitted into the guide groove, and when folded, the flat area S2 of the flexible display panel 001 may move relative to the middle frame 12 and the bearing frame 4. The movement of the flexible display panel 001 can be guided through the guide groove and the flexible display panel 001 is prevented from warping.

Further, as shown in FIGS. 6 and 11, in order to ensure a stable position of the flexible display panel 001, a position of the bending area S1 may be limited. Specifically, a surface of the flexible display panel 001 close to the bearing frame 4 is provided with a supporting post 011, and the supporting post 011 is located in the bending area S1. Furthermore, the positioning shaft 211 among the individual rotating shafts 21 is fixed on the supporting beam 1. The positioning shaft 211 is opened with a positioning groove 2111, and the supporting post 011 is snapped into the positioning groove 2111, so that the bending area S1 can only be bent, and cannot translate. In some embodiments of the present disclosure, the supporting post 011 may be disposed on a surface of the supporting layer close to the bearing frame 4, and the supporting post 011 is disposed on a surface of the supporting layer away from the driving backplane. The supporting post 011 may be integrally formed with the supporting layer, or may also be fixedly coupled to the supporting layer by bonding, snapping, etc., as long as it can limit the position of the bending area S1.

The number of supporting posts 011 may be one or more, and the supporting posts 011 are distributed along a central axis of the bending area S1. The number and positions of positioning grooves 2111 correspond to the supporting posts 011, and the respective supporting posts 011 are snapped into the respective positioning grooves 2111 in a one-to-one correspondence.

Further, as shown in FIGS. 2 and 3, in some embodiments of the present disclosure, the middle frame body 121 of the middle frame 12 may be provided with a strip hole extending in a direction perpendicular to the distribution direction of the rotating shafts 21. A sliding member 14 that can slide back and forth along a length direction of the strip hole 1201 may be disposed within the strip hole 1201. The sliding member 14 may be coupled to a surface of the flexible display panel 001 close to the middle frame 12. When the flexible display panel 001 is bent, the flat area S2 will move relative to the middle frame 12, and at this time, the sliding member 14 can slide in the strip hole 1201 to guide the movement of the flat area S2 relative to the middle frame 12.

Further, as shown in FIGS. 14 and 15, in some embodiments of the present disclosure, the display device may further include a covering member 10, and the covering member 10 may be disposed on a side of the mounting frame 101 close to the bearing frame 4, and is coupled to the mounting frame 101 in a detachable manner such as snapping or screw connection. The flexible display panel 001 is located between the covering member 10 and the middle frame 12, and at least a partial area of the covering member 10 is in contact with an area, located in the peripheral area, of a light extraction surface of the flexible display panel 001, so that the position of the flexible display panel 001 can be limited through the covering member 10 and the middle frame 12.

In addition, as shown in FIGS. 1 and 13, the display device may further include a cover plate 15, which may be disposed on a side of the bearing frame 4 away from the flexible display panel 001 and between the two bearing frames 4. The cover plate 15 is configured to shield the rotating shaft assembly 2 and the transmission assembly 3, thereby ensuring that the back side of the display device is flat.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A folding mechanism, comprising: a supporting beam; a rotating shaft assembly, comprising a plurality of rotating shafts extended along a length direction of the supporting beam, wherein the plurality of rotating shafts comprise a positioning shaft and transmission shafts distributed on both sides of the positioning shaft, and the positioning shaft is disposed on the supporting beam; a transmission assembly sequentially coupling individual rotating shafts in series along a distribution direction of the rotating shafts, wherein any rotating shaft is rotatable around an adjacent rotating shaft; and two bearing frames coupled to both sides of the transmission assembly, wherein the two bearing frames are rotatable around the positioning shaft between a first form, an unfolded form and a second form under transmission of the rotating shaft assembly and the transmission assembly, wherein the two bearing frames and the individual rotating shafts are distributed along a plane in the unfolded form, the two bearing frames are arranged oppositely and located on a side of the positioning shaft in the first form, and the two bearing frames are arranged oppositely and located on the other side of the positioning shaft in the second form; and the transmission assembly comprises a plurality of gear pairs, each gear pair comprises two transmission gears meshed with each other that couple two rotating shafts in a transmission manner, and individual gear pairs are sequentially coupled to the individual rotating shafts along the distribution direction of the rotating shafts; and two outermost gear pairs in the distribution direction of the rotating shafts are respectively coupled to a bearing frame; and the individual gear pairs are divided into a plurality of gear chains distributed along an axial direction of a rotating shaft, and each gear chain comprises the plurality of gear pairs; and in two adjacent gear pairs of the same gear chain, two transmission gears coupled to adjacent rotating shafts are fixedly coupled.

2. The folding mechanism according to claim 1, wherein each transmission gear is an incomplete gear.

3. The folding mechanism according to claim 2, wherein in the two adjacent gear pairs of the same gear chain, the two transmission gears coupled to two adjacent rotating shafts are coupled into an integral structure through a connection part.

4. The folding mechanism according to claim 1, wherein each transmission gear comprises a plurality of gear pieces with the same profile stacked along an axial direction of a rotating shaft.

5. The folding mechanism according to claim 1, wherein the gear chains comprise a plurality of first gear chains and a plurality of second gear chains alternately distributed along the axial direction of the rotating shaft, and gear pairs of the first gear chains and gear pairs of the second gear chains are alternately distributed along the distribution direction of the rotating shafts.

6. The folding mechanism according to claim 1, wherein the transmission assembly further comprises:
a plurality of connection strips, wherein a transmission gear coupled to an outermost rotating shaft in the distribution direction of the rotating shafts is fixedly coupled to a connection strip;
wherein respective connection strips located on the side of the positioning shaft are coupled by a connection shaft extended along the length direction of the supporting beam; and
the connection shaft on the side of the positioning shaft is rotatably coupled to a bearing frame, and a connection shaft on the other side of the positioning shaft is rotatably coupled to the other bearing frame.

7. The folding mechanism according to claim 6, wherein the bearing frame is provided with a supporting base, and an end of the connection shaft is rotatably inserted into the supporting base.

8. The folding mechanism according to claim 6, wherein the folding mechanism further comprises:
two connection plates, wherein the respective connection strips located on the side of the positioning shaft are fixedly coupled to a connection plate, and respective connection strips located on the other side of the positioning shaft are fixedly coupled to the other connection plate.

9. The folding mechanism according to claim 1, wherein the number of transmission assemblies is one or more, and the transmission assemblies are distributed at intervals along an axial direction of a rotating shaft.

10. The folding mechanism according to claim 9, wherein the number of transmission shafts is six, and the transmission shafts are symmetrically distributed on the both sides of the positioning shaft;
the transmission shafts located on either side of the positioning shaft comprise a first transmission shaft, a second transmission shaft and a third transmission shaft distributed in a direction away from the positioning shaft;
an area of the first transmission shaft located between two adjacent transmission assemblies is sleeved with a first intermediate shaft sleeve, an area of the second transmission shaft located between the two adjacent transmission assemblies is sleeved with a second intermediate shaft sleeve, and an area of the third transmission shaft located between the two adjacent transmission assemblies is sleeved with a third intermediate shaft sleeve; and
the first intermediate shaft sleeve has a connection part extended in a radial direction, the second intermediate shaft sleeve is provided with a first notch exposing the second transmission shaft, and the connection part is rotatably fitted in the first notch and sleeved on the second transmission shaft; and the second intermediate shaft sleeve is fixedly coupled with the third intermediate shaft sleeve.

11. The folding mechanism according to claim 9, wherein the number of transmission shafts is six, and the transmission shafts are symmetrically distributed on the both sides of the positioning shaft;
the transmission shafts located on either side of the positioning shaft comprise a first transmission shaft, a second transmission shaft and a third transmission shaft distributed in a direction away from the positioning shaft;
an end of the first transmission shaft is sleeved with a first end shaft sleeve, an end of the second transmission shaft is sleeved with a second end shaft sleeve, and an end of the third transmission shaft is sleeved with a third end shaft sleeve; and
the first end shaft sleeve is fixedly coupled with the second end shaft sleeve; the third end shaft sleeve has a connection part extended in a radial direction, the second end shaft sleeve is provided with a second notch exposing the second transmission shaft, and the connection part is rotatably fitted in the second notch and sleeved on the second transmission shaft.

12. The folding mechanism according to claim 1, wherein the folding mechanism further comprises:
a synchronization assembly, disposed at an end of the supporting beam, coupled between the two bearing frames, and configured to make the two bearing frames rotate synchronously.

13. The folding mechanism according to claim 12, wherein the end of the supporting beam is provided with a mounting frame, and the rotating shaft assembly is located on a side of the mounting frame close to the supporting beam;
the synchronization assembly comprises two driving gears and two driven gears disposed on the mounting frame, the two driven gears are meshed between the two driving gears, and the driving gears and the driven gears have the same axial direction as the rotating shafts; and
the bearing frames are fixedly coupled to the two driving gears in a one-to-one correspondence, and any bearing frame is rotatable around a central axis of a driving gear to which the bearing frame is coupled.

14. The folding mechanism according to claim 13, wherein an end face of a driving gear away from the supporting beam has a connection disk, a bearing frame is provided with a connection hole, and the connection disk is snapped into the connection hole.

15. A display device, comprising: a folding mechanism, wherein the folding mechanism comprises: a supporting beam; a rotating shaft assembly, comprising a plurality of rotating shafts extended along a length direction of the supporting beam, wherein the plurality of rotating shafts comprise a positioning shaft and transmission shafts distributed on both sides of the positioning shaft, and the positioning shaft is disposed on the supporting beam; a transmission assembly sequentially coupling individual rotating shafts in series along a distribution direction of the rotating shafts, wherein any rotating shaft is rotatable around an adjacent rotating shaft; and two bearing frames coupled to both sides of the transmission assembly, wherein the two bearing frames are rotatable around the positioning shaft between a first form, an unfolded form and a second form under transmission of the rotating shaft assembly and the transmission assembly, wherein the two bearing frames and the individual rotating shafts are distributed along a plane in the unfolded form, the two bearing frames are arranged oppositely and located on a side of the positioning shaft in the first form, and the two bearing frames are arranged oppositely and located on the other side of the positioning shaft in the second form; and a flexible display panel with a bending area and flat areas on both sides of the bending area, wherein the flat areas are attached to the bearing frames in a one-to-one correspondence, and the bending area corresponds to the rotating shaft assembly; and the display device further comprises: a plurality of guide blocks fixed on a side of the middle frame away from the bearing frames and distributed along a circumferential direction of the flexible display panel, wherein a guide block is provided with a guide groove penetrating the guide block along the circumferential direction of the flexible display panel, and an edge of the flexible display panel is slidably fitted in the guide groove.

16. The display device according to claim 15, wherein the display device further comprises:

a front frame disposed around the flexible display panel and comprising two front frame bodies spaced apart from each other, wherein a front frame body is at least partially covered on an outer edge of a bearing frame, and the other front frame body is at least partially covered an outer edge of the other bearing frame; and a middle frame, disposed between the flexible display panel and the bearing frames, and comprising two middle frame bodies disposed within the two front frame bodies in a one-to-one correspondence; wherein a bearing frame and a middle frame body in any front frame body are coupled.

17. The display device according to claim 15, wherein a surface of the bending area close to the bearing frames is provided with a supporting post; and the positioning shaft is fixed on the supporting beam, the positioning shaft is provided with a positioning groove, and the supporting post is snapped into the positioning groove.

\* \* \* \* \*